(12) United States Patent
Satish et al.

(10) Patent No.: US 11,769,022 B2
(45) Date of Patent: Sep. 26, 2023

(54) METHODS AND SYSTEMS FOR PROCESSING AN IMAGE

(71) Applicant: Gauss Surgical, Inc., Menlo Park, CA (US)

(72) Inventors: Siddarth Satish, Redwood City, CA (US); Kevin J. Miller, Mountain View, CA (US)

(73) Assignee: Gauss Surgical Inc., Menlo Park, CA (US)

( * ) Notice: Subject to any disclaimer, the term of this patent is extended or adjusted under 35 U.S.C. 154(b) by 338 days.

(21) Appl. No.: 17/283,508

(22) PCT Filed: Oct. 14, 2019

(86) PCT No.: PCT/US2019/056076
§ 371 (c)(1),
(2) Date: Apr. 7, 2021

(87) PCT Pub. No.: WO2020/081435
PCT Pub. Date: Apr. 23, 2020

(65) Prior Publication Data
US 2021/0397916 A1   Dec. 23, 2021

Related U.S. Application Data

(60) Provisional application No. 62/745,577, filed on Oct. 15, 2018.

(51) Int. Cl.
*G06K 7/14* (2006.01)
*G06T 7/13* (2017.01)
(Continued)

(52) U.S. Cl.
CPC ........... *G06K 7/146* (2013.01); *G06K 7/1452* (2013.01); *G06K 19/027* (2013.01);
(Continued)

(58) Field of Classification Search
CPC .... G06K 7/146; G06K 7/1452; G06K 19/027; G06K 19/06037; G06K 19/0614;
(Continued)

(56) References Cited

U.S. PATENT DOCUMENTS

| 7,264,174 B2 | 9/2007 | Chang et al. |
| 11,267,153 B2 * | 3/2022 | Rivers ..................... B25F 5/021 |

(Continued)

FOREIGN PATENT DOCUMENTS

| CN | 113454646 A | 9/2021 |
| JP | 2006338251 A | 12/2006 |

(Continued)

OTHER PUBLICATIONS

English language abstract and machine-assisted English translation for JP 2012-194831 A extracted from espacenet.com database on Aug. 8, 2022, 18 pages.

(Continued)

*Primary Examiner* — Tuyen K Vo
(74) *Attorney, Agent, or Firm* — Howard & Howard Attorneys PLLC (57) ABSTRACT

A system performs a method for processing an image of a machine-readable code. The method includes receiving an image of a machine-readable code comprising coded information, where the machine-readable code is at least partially obscured by a substance that has a predominant color; generating an adjusted image by adjusting a color space of the image based on the predominant color; binarizing at least a machine-readable code region of the image, wherein the machine-readable code region of the image depicts the machine-readable code; and decoding the binarized machine-readable code region to determine the coded information. Other apparatus and methods are also described.

23 Claims, 5 Drawing Sheets

(51) Int. Cl.
G06K 19/02 (2006.01)
G06K 19/06 (2006.01)

(52) U.S. Cl.
CPC ... G06K 19/0614 (2013.01); G06K 19/06037 (2013.01); G06T 7/13 (2017.01)

(58) Field of Classification Search
CPC ... G06T 7/13; G06T 7/11; G06T 2207/10024; G06T 2207/20084; G06T 7/136; H04N 1/40012; H04N 1/58; H04N 1/62
See application file for complete search history.

(56) References Cited

U.S. PATENT DOCUMENTS

| | | | |
|---|---|---|---|
| 2001/0036293 | A1 | 11/2001 | Laumeyer et al. |
| 2007/0125392 | A1 | 6/2007 | Olson et al. |
| 2011/0142278 | A1* | 6/2011 | Su .................. H04N 1/00328 382/100 |
| 2013/0341402 | A1 | 12/2013 | Itakura et al. |
| 2015/0304109 | A1* | 10/2015 | Tran .................. G06F 21/16 380/28 |
| 2016/0104310 | A1 | 4/2016 | Van Gorp et al. |
| 2016/0342873 | A1 | 11/2016 | Feld et al. |
| 2016/0379029 | A1 | 12/2016 | Fang |
| 2019/0080130 | A1* | 3/2019 | Kuo .................. G06K 7/1473 |
| 2019/0130042 | A1* | 5/2019 | Gabriel .............. G06Q 20/10 |

FOREIGN PATENT DOCUMENTS

| | | | |
|---|---|---|---|
| JP | 2012194831 | A | 10/2012 |
| JP | 2017016635 | A | 1/2017 |
| JP | 2017191565 | A | 10/2017 |
| WO | 2009057651 | A1 | 5/2009 |
| WO | WO-2018125812 | A1 | 7/2018 |
| WO | WO-2020081435 | A1 | 4/2020 |

OTHER PUBLICATIONS

English language abstract for JP 2017-016635 A extracted from espacenet.com database on Aug. 8, 2022, 1 page.

English language abstract and machine-assisted English translation for JP 2017-191565 A extracted from espacenet.com database on Aug. 8, 2022, 23 pages.

English language abstract for WO 2009/057651 A1 and machine-assisted English translation for equivalent JP 2009-111869 A extracted from espacenet.com database on Aug. 8, 2022, 22 pages.

"Chinese Application Serial No. 201980082995.1, Notification to Make Rectification dated Jul. 7, 2021", with machine translation, 2 pgs.

"Chinese Application Serial No. 201980082995.1, Response filed Aug. 30, 2021 to Notification to Make Rectification dated Jul. 7, 2021", with machine translation, 2 pgs.

"International Application Serial No. PCT/US2019/056076, International Preliminary Report on Patentability dated Apr. 29, 2021", 6 pgs.

"European Application Serial No., Response to Communication pursuant to Rules 161(2) and 162 EPC filed Nov. 2, 2021", 13 pgs.

"International Application Serial No. PCT/US2019/056076, International Search Report dated Dec. 19, 2019", 2 pgs.

"International Application Serial No. PCT/US2019/056076, Written Opinion dated Dec. 19, 2019", 4 pgs.

Greensted, Andrew, "Otsu Thresholding—The Lab Book Pages", http://www.labbookpages.co.uk/software/imgProc/otsuThreshold.html, Jun. 17, 2010, 4 pages.

Otsu, Nobuyuki, "A Threshold Selection Method from Gray-Level Histograms", IEEE Transactions on Systems, Man and Cybernetics, vol. 9, No. 1, Jan. 1, 1979, pp. 62-66.

English language abstract and machine-assisted English translation for JP 2006-338251 A extracted from espacenet.com database on Dec. 9, 2022, 12 pages.

* cited by examiner

METHODS AND SYSTEMS FOR PROCESSING AN IMAGE

RELATED APPLICATION

This application is a national phase entry of PCT/US2019/056076 titled "METHODS AND SYSTEMS FOR PROCESSING AN IMAGE," and filed Oct. 14, 2019, which claims the priority benefit of U.S. Provisional Patent Application No. 62/745,577, filed Oct. 15, 2018 titled "METHODS AND SYSTEMS FOR PROCESSING AN IMAGE," which is incorporated herein by reference in its entirety.

TECHNICAL FIELD

The subject matter disclosed herein generally relates to the technical field of special-purpose machines that facilitate image processing, including software-configured computerized variants of such special-purpose machines and improvements to such variants, and to the technologies by which such special-purpose machines become improved.

BACKGROUND

One common way to package information about an item is to associate the item with a unique visual graphic, such as a machine-readable code. For example, a machine-readable code associated with a particular item may include identifying information about that item, descriptive information about that item, or both, and the machine-readable code may be used to distinguish the associated item from other (e.g., similar) items.

Generally, barcodes and other graphics including data may be machine-readable to provide faster, more accurate ways to interpret the information represented by the machine-readable codes. For example, machine-readable codes may be read and interpreted by specialized optical scanners. As another example, machine-readable codes may be read and interpreted through image processing techniques.

However, conventional image processing techniques for reading visual machine-readable codes may lead to inaccurate or incomplete results if the image fails to clearly depict the machine-readable code. For example, in some instances, a machine-readable code may be partially covered or obscured. It may be difficult, for example, for conventional image processing techniques to accurately process a 2D machine-readable code (e.g., a QR code) when the 2D machine-readable code is soiled with a substance, because the substance may make it more difficult to distinguish between differently shaded elements (e.g., blocks) in the patterned matrix of the 2D machine-readable code.

BRIEF DESCRIPTION OF THE DRAWINGS

Some example embodiments are illustrated by way of example and not limitation in the figures of the accompanying drawings.

DETAILED DESCRIPTION

Example methods (e.g., procedures or algorithms) facilitate image processing, including image processing of machine-readable codes soiled with a substance (e.g., blood), and example systems (e.g., special-purpose machines configured by special-purpose software) are configured to facilitate such image processing. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided. In the following description, for purposes of explanation, numerous specific details are set forth to provide a thorough understanding of various example embodiments. It will be evident to one skilled in the art, however, that the present subject matter may be practiced without these specific details.

In some example embodiments, a method for processing an image of a machine-readable code includes receiving an image of a machine-readable code comprising coded information, where the machine-readable code is at least partially obscured by a substance having a predominant color, generating an adjusted image by adjusting the color space of the image based on the predominant color, and binarizing at least a machine-readable code region of the image, where the machine-readable code region of the image depicts the machine-readable code. The method may further include capturing the image of the machine-readable code with an optical sensor, decoding the binarized machine-readable code region to determine the coded information, or both.

In certain example embodiments, a system for processing an image of a machine-readable code includes one or more processors configured to (e.g., at least) receive an image of a machine-readable code comprising coded information, where the machine-readable code is at least partially obscured by a substance having a predominant color, generate an adjusted image by adjusting the color space of the image based on the predominant color, and binarize at least a machine-readable code region of the image, where the machine-readable code region of the image depicts the machine-readable code. The one or more processors may be further configured to decode the binarized machine-readable code region to determine the coded information. In some variations, the system includes an optical sensor configured to capture the image of the machine-readable code.

In various example embodiments, the received or captured image is a color image, and the image may be adjusted at least in part by adjusting a color space of the color image to a grayscale representation (e.g., by isolating a color channel associated with, or similar to, the predominant color of the substance). The machine-readable code region may be located in the image through techniques such as corner detection techniques, edge detection techniques, other suitable computer vision techniques, or any suitable combination thereof. Furthermore, additional image processing (e.g., binarization, with or without one or more color thresholding processes) may be performed to further process (e.g., "clean" the machine-readable code region of the image for interpretation (e.g., decoding).

The methods and systems described herein may be used in a variety of applications, such as processing an image of a machine-readable code associated with (e.g., attached to, representative of, or otherwise corresponding to) a surgical textile, where the machine-readable code may be at least partially obscured with one or more bodily fluids (e.g., blood). For example, the predominant color of the substance on the machine-readable code may be red, and an image of the machine-readable code may be adjusted by isolating the red channel of the image within the image's color space. The machine-readable code may include any suitable coded information (e.g., a unique identifier of the associated surgical textile, a type of the associated surgical textile, or both) that may provide useful information to a user. For example, in response to (e.g., upon) determining the coded information of a machine-readable code and determining an identifier a surgical textile associated with the machine-readable code, a textile counter index may be incremented. The value on the textile counter index may then be presented as output on a display, via an audio device, or both.

In some example embodiments, a system includes:
one or more processors; and
a memory storing instructions that, when executed by the one or more processors, cause the one or more processors to perform operations comprising:
accessing an image that depicts a machine-readable code being at least partially obscured by a substance that has a predominant color in the image;
generating an adjusted version of the image by adjusting a color space of the image based on the predominant color of the substance that at least partially obscures the machine-readable code; and
binarizing at least a region of the adjusted version of the image, the region depicting the machine-readable code.

In certain example embodiments, a method includes:
accessing, by one or more processors of a machine, an image that depicts a machine-readable code being at least partially obscured by a substance that has a predominant color in the image;
generating, by the one or more processors of the machine, an adjusted version of the image by adjusting a color space of the image based on the predominant color of the substance that at least partially obscures the machine-readable code; and
binarizing, by the one or more processors of the machine, at least a region of the adjusted version of the image, the region depicting the machine-readable code.

In various example embodiments, a machine-readable medium includes instructions that, when executed by one or more processors of a machine, cause the machine to perform operations including:
accessing an image that depicts a machine-readable code being at least partially obscured by a substance that has a predominant color in the image;
generating an adjusted version of the image by adjusting a color space of the image based on the predominant color of the substance that at least partially obscures the machine-readable code; and
binarizing at least a region of the adjusted version of the image, the region depicting the machine-readable code.

Generally, the methods and systems described herein may be used to process an image of one or more machine-readable codes. That is, the image depicts one or more machine-readable codes that are readable by an optical device. Examples of such optically machine-readable codes include barcodes, (e.g., a linear barcode or other one-dimensional (1D) barcode, or a two-dimensional (2D) barcode, such as a QR code) and or other suitable graphics that carry coded information in optically readable form, such as in a patterned matrix of black and white elements or of other optically contrasting elements. Such a machine-readable code may be used in various applications to provide information about one or more items associated with (e.g., attached to, representative of, or otherwise corresponding to) the machine-readable code. For example, during surgery and other medical procedures, surgical textiles (e.g., surgical sponges or other items that may be used to absorb various fluids, including patient blood) may include machine-readable codes, such that each machine-readable code may be associated with a particular surgical textile. In some situations, a machine-readable code may be depicted (e.g., printed, woven, etc.) on a tag that is sewn or otherwise attached to a surgical textile. In certain situations, a machine-readable code may be depicted in the surgical textile itself. A machine-readable code may include coded information about the associated surgical textile such as its manufacturer, its type, its material, its size, its identifier (e.g., a serial number unique to that surgical textile among other surgical textiles), or any suitable combination thereof. Accordingly, a machine-readable code may be scanned (e.g., imaged) and interpreted through a decoding process, such as by computer vision techniques, to yield and utilize the coded information contained therein.

In some situations, machine-readable codes associated with surgical textiles are scanned both prior to and after a medical procedure (e.g., a surgical procedure) to keep track of surgical textiles and identify any surgical textiles that may have been inadvertently retained in the patient. Such scanning may provide "before" and "after" counts of surgical textiles. A discrepancy between the "before" and "after" counts may prompt medical staff to locate any apparently missing textiles, perform a recount, perform an X-ray scan of the patient, or perform other risk mitigation.

However, during a medical procedure, machine-readable codes on surgical textiles may become bloodied or otherwise soiled (e.g., with other body fluids). In situations where a machine-readable code includes dark and light elements (e.g., light and dark segments of a matrix), any dark-colored substances (e.g., blood) may at least partially obscure the machine-readable code and interfere with, or even prevent, accurate scanning of the machine-readable code. With respect to the counting of surgical textiles, described above, such potentially faulty scanning of machine-readable codes may lead to uncertainty in whether the counts are correct (e.g., the "after" counts). Erroneous counting may cause medical staff to incorrectly conclude that there is a surgical textile retained in the patient, or worse, incorrectly conclude that all surgical textiles are accounted for and that all textiles are removed from the patient. The methods and systems described herein are capable of processing an image of a machine-readable code and are robust against errors due to obscuration of the machine-readable code.

Furthermore, while some example embodiments of the methods and systems described herein may be used to track surgical textiles within the same medical procedure or the same medical session, other example embodiments may additionally or alternatively be used to track surgical textiles among different medical procedures or medical sessions. Surgical textiles may inadvertently travel between different medical sessions (e.g., on or with a nurse or other person moving between different rooms). This may lead to inaccurate textile counts in an origin session, a destination session, or both, such as due to inadvertent duplicate counting of the traveling surgical textile in its origin session, its destination session, or both. Accordingly, in some example embodiments, the methods and systems described herein may be used to identify textiles that were used during different medical procedures and improve accuracy in tracking surgical textiles, counting surgical textiles, or both.

Figure 1:
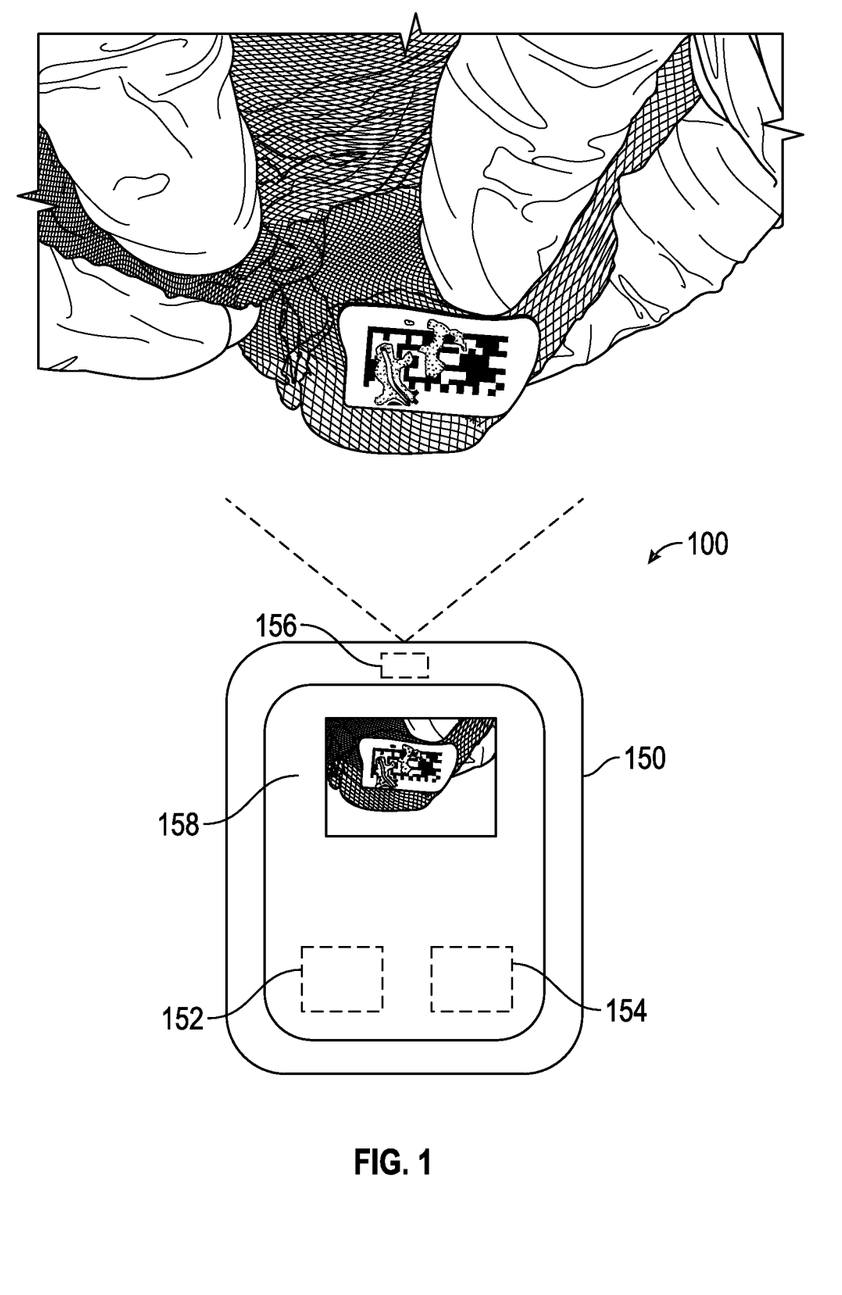
FIG. 1 is a schematic diagram illustrating a system for processing an image, according to some example embodiments.

The methods and systems described herein may be used in a variety of settings, including in a hospital or clinic setting (e.g., an operating room), a military setting (e.g., a battlefield), or other suitable medical treatment settings. The methods described herein may be computer-implemented and performed at least in part by one or more processors. As shown in FIG. 1, the methods discussed herein may be performed at least in part by a computer device, such as a mobile device 150 (e.g., a tablet, a smartphone, etc.) that is configured to capture images of one or more surgical textiles in an operating room or other medical setting and process the resulting images. Furthermore, the methods discussed herein may be performed by one or more processors that are separate from the mobile device 150 (e.g., on-site in the operating room or remotely outside the operating room).

Methods for Processing an Image of a Machine-Readable Code

Figure 2:
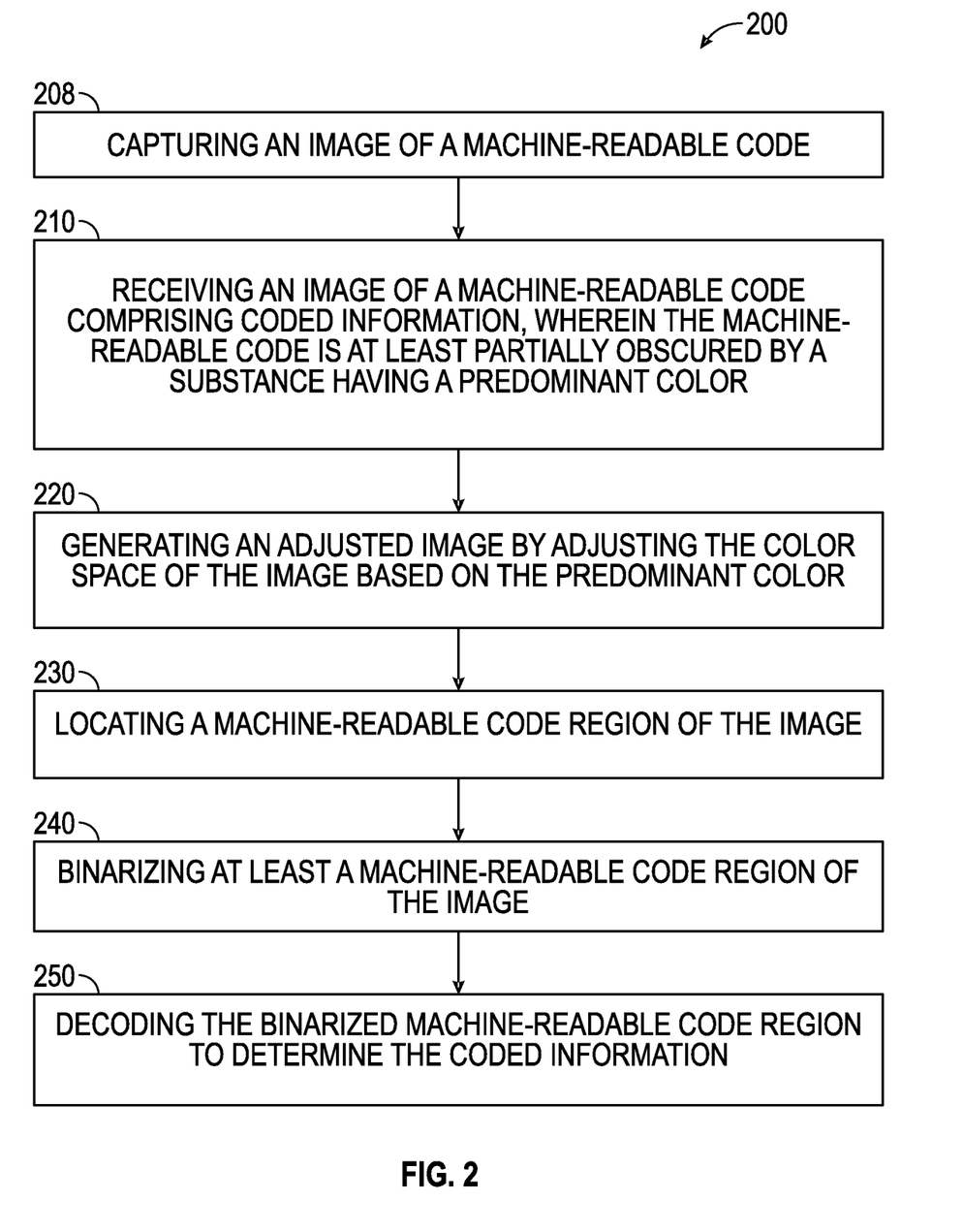
FIG. 2 is a flowchart illustrating operation of the system in performing a method of processing an image, according to some example embodiments.

As shown in FIG. 2, according to some example embodiments, a method 200 for processing an image of a machine-readable code includes receiving an image of a machine-readable code comprising coded information (at operation 210), where the machine-readable code is at least partially obscured by a substance having a predominant color. The method 200 also includes generating an adjusted image (at operation 220) by adjusting the color space of the image, based on the predominant color. The method 200 further includes binarizing at least a machine-readable code region of the image (at operation 230), where the machine-readable code region of the image depicts the machine-readable code. The method 200 still further includes decoding the binarized machine-readable code region to determine the coded information (at operation 250). In some variations, the method 200 further includes capturing the image of the machine-readable code (at operation 208). In certain variations, the operations (e.g., steps) depicted in FIG. 2 may be performed in an order different from the depicted order.

As shown in FIG. 2, some example embodiments of the method 200 include capturing an image of a machine-readable code (at operation 208) or generating or otherwise obtaining at least one image of a machine-readable code. One or more images of the machine-readable code may be stored in a database in a suitable data storage medium (e.g., local or remote). Accordingly, the receiving of the image of the machine-readable code in operation 210 may include receiving the image from memory or other suitable storage. For example, the images may have been previously acquired and stored in a storage medium. Each image may depict an entire surgical textile associated with (e.g., attached to) the machine-readable code, or only a portion of the surgical textile associated with the machine-readable code. The surgical textile may be, for example, a surgical sponge, a surgical dressing, a towel, or other suitable textile.

Each image may be a single still image or an image frame from a video feed, and may include a region (e.g., a machine-readable code region) that depicts the corresponding machine-readable code, for example, within the field of view of a camera. The camera may be in a handheld device or mobile device (e.g., a tablet). The camera may be mounted to a support, such as a table, or may be an overhead camera. The image may be an optical image that captures color characteristics, with component values for each pixel in a color space (e.g., RGB, CMYK, etc.). The image may be stored in memory or a suitable data storage module (e.g., local or remote) and processed. Processing the image may include normalizing the color characteristics of the image based on a set of one or more optical fiducials (e.g., a color fiducial). The color fiducial may represent, for example, one or more red hues (e.g., a grid including boxes of different red hues). Normalization of the image may include utilizing the color fiducial to compensate for variations in lighting conditions throughout a medical procedure (e.g., a surgical procedure), to artificially match lighting conditions in the image to a template image, to artificially match lighting conditions in the image to light condition-dependent fluid component concentration models, or any suitable combination thereof. For example, normalizing the image may include identifying a color fiducial captured in the image, determining an assigned color value associated with the identified color fiducial, and adjusting the image such that the color value of the color fiducial in the image substantially matches the assigned color value associated with the color fiducial. The assigned color value can, for example, be determined by looking up the color fiducial in a database (e.g., identified by a code, a position within a set of color fiducials, a position relative to a known feature of the conduit, or any suitable combination thereof). Adjustments to the image can include, for example, adjustment of exposure, contrast, saturation, temperature, tint, or any suitable combination thereof.

Image Preprocessing

The method 200 may include generating an adjusted image (at operation 220), such as by adjusting the color space of the image based on a predominant color of a substance that is at least partially obscuring the machine-readable code depicted in the image. In some example embodiments, color conversion by isolating a color (e.g., a color channel similar to the predominant color of the substance that is at least partially obscuring the machine-readable code) may mitigate the effect of the substance obscuring one or more features (e.g., elements or segments) of the machine-readable code. For example, blood tends to absorb less red light (e.g., light with wavelengths in the range of 620-740 nm or within a portion of this range, such as 635-700 nm) and reflect more red light than light of other colors (e.g., light of other wavelengths outside the range of 620-740 nm). In example situations where the machine-readable code includes white elements and black elements, any bloodstained white elements could be misread as black elements. Supposing for example that the image has red, green, and blue (RGB) color components, white pixels have substantially the same red (R) values as red pixels, though the white pixels additionally have green (G) and blue (B) values. Thus, isolating the red (R) channel of the image (e.g., by removing the green (G) and blue (B) channels of the image) causes any bloodstained white elements of the machine-readable code to become identifiable as originally white elements of the machine-readable code, and the bloodstained white elements thus become disambiguated from the black elements of the machine-readable code. Accordingly, the red channel of the image may be isolated (e.g., and retained in the adjusted image), such that in the adjusted image, any blood-obscured white features of the machine-readable code will look similar to unobscured white features of the machine-readable code (e.g., elements not obscured by blood).

In other example embodiments, one or more other color channels are isolated (e.g., and retained in the adjusted image), such as any one or more color channels of a predefined color space (e.g., RGB, XYZ, CIE-LAB, YCrCb, CMYK, etc.). Additionally or alternatively, other color mappings may be used to preprocess images. For example, some variations of the method 200 apply linear or non-linear equations (e.g., predefined equations) that map from an existing color space (e.g., RGB or other color space of the optical sensor used to capture the image) to another color space. In certain example embodiments, the method 200 applies mappings that are learned from data using machine learning techniques such as SYM-regression, neural networks, K-nearest neighbor, local-weighted linear regression, decision tree regression, or any suitable combination thereof.

In various example embodiments, the method 200 further includes adjusting the image in other suitable manners. In some situations, a substance such as blood on the machine-readable code problematically interferes with textural information, creates false textures, or both, and the locating of the machine-readable code region of the image (at operation 240) may be based on corner detection, edge detection, or both. If the substance on the machine-readable code occludes corners, makes corners look less sharp, creates false corners (e.g., due to glare, clots, etc.), or any combination of thereof, method 200 may further include reducing high frequency noise and preserving or restoring a high frequency signal to maintain the sharpness of edges and corners (e.g., by increasing the signal to noise ratio). For example, high frequency noise may be reduced with suitable smoothing algorithms (e.g., Gaussian blurring, median blurring, or any suitable combination thereof). Furthermore, preserving or restoring one or more high frequency signals may be achieved, for example, with a suitable deblurring algorithm (e.g., unsharp filtering, suitable optimization-based algorithms, etc.).

As another example, the method 200 may reduce high frequency noise while preserving high frequency signals by applying a bilateral filter on the image with suitable thresholding. Additionally or alternatively, a trained neural network or other machine learning model may take the image of the machine-readable code as an input and output a suitable preprocessed or adjusted image, where the model may be trained using manually processed (e.g., manually "cleaned") images that are processed in the desired manner.

Locating the Machine-Readable Code

The method 200 (at operation 230) may include locating a region of the image (e.g., locating a machine-readable code region of the image) that depicts the machine-readable code. Locating this region may involve estimating the position of the machine-readable code, the size of the machine-readable code, the perimeter of the machine-readable code, the orientation of the machine-readable code, any other suitable physical aspects of the machine-readable code, or any suitable combination thereof, within the image. In some example embodiments, one or more suitable computer vision techniques are used to find one or more distinctive features of the machine-readable code, such as corners, straight edges that are close to corners, edge directions that are 90 degrees from each other, edges that are collinear, certain spatial frequency bands, bimodal color distributions, or any suitable combination thereof. As an example, the method 200 may include finding an L-shaped finder pattern associated with the machine-readable code, an alternating black-and-white timing pattern in the image associated with the machine-readable code, or both.

In some example embodiments, a neural network model (e.g., Fast-RCNN, YOLO, SSD, or other architectures suitable for object detection and localization tasks) or other machine learning model is trained to predict the location of the machine-readable code from a raw or preprocessed image that is processed in a manner similar to those described above (e.g., as part of locating the machine-readable code, such as at operation 230 in the method 200). Such a neural network may be trained, for example, with a sufficient number of obscured (e.g., bloodied) images of machine-readable codes to extract features that are robust to obscuration.

In some example embodiments, a corner detection algorithm (e.g., a Harris corner detection algorithm) is used to obtain a heat map with heat map values for coordinates within the image (e.g., as part of locating the machine-readable code, such as, at operation 230 in the method 200). A heat map value for a coordinate may be produced by, for example, analyzing the rate of change (e.g., of brightness) within a sliding window as it slides around the coordinate. For example, the amount of change may be approximated as a quadratic function of the sliding window offset, and the lowest rate of change in any direction may be found and used as the heat map value. Accordingly, a high heat map value implies that the sliding window will change by a large amount in any direction (e.g., a corner), whereas a low heat map value implies that there is at least one direction that will not change the window significantly (e.g., a long edge). A coordinate in the image may be determined a corner coordinate (e.g., a corner of the machine-readable code) if its heat map value is above a first, upper predetermined threshold value. Furthermore, a coordinate in the image may be determined a straight edge coordinate (e.g., along a side, upper, or lower edge coordinate) if its heat map value is above a second, lower predetermined threshold value that is below the first predetermined threshold value. Any corner coordinates and straight edge coordinates that are spatially near a corner coordinate may be considered as a set of coordinates of interest. In various example embodiments, fewer threshold values or more threshold values may be used to categorize coordinates appropriately.

Outlier coordinates (e.g., coordinates that likely do not come from or correspond to the machine-readable code) may be removed from coordinates of interest, such as based on a median, a interquartile range, another suitable statistical measure, or any suitable combination thereof (e.g., as part of locating the machine-readable code, such as at operation 230 in the method 200). After removing outlier coordinates, a tight rotated rectangle (e.g., under an assumption that the machine-readable code is generally rectangular) may be fitted around the remaining coordinates of interest as an initial estimate of the position of the machine-readable code, the area of the machine-readable code, the perimeter of the machine-readable code, the orientation of the machine-readable code, or any suitable combination thereof.

In some example embodiments, the initial estimate of the machine-readable code attributes described above may be subsequently adjusted (e.g., as part of locating the machine-readable code, such as at operation 230 in the method 200). For example, the estimated area of the machine-readable code or the boundaries of the machine-readable code may be modified to have an aspect ratio (e.g., length to width) that is the same or similar to a known aspect ratio of the depicted (e.g., imaged) machine-readable code. Additionally or alternatively, the estimated orientation may be refined by taking a Hough transform within the rectangle and taking the median orientation of the resulting Hough lines (e.g., after rotating some of the Hough lines by 90 degrees, to account for the fact that some lines will be perpendicular to any machine-readable code line directions).

It should be understood that the above-described application of the Harris corner detection algorithm may be modified for different machine-readable code shapes (e.g., as part of locating the machine-readable code, such as at operation 230 in the method 200). For example, other suitable shapes may be fitted around the coordinates of interest, which may depend on the shape of the depicted (e.g., imaged) machine-readable code, if known (e.g., a circle fitted for a circular machine-readable code, a triangle fitted for a triangular machine-readable code, a pentagon fitted for a pentagonal machine-readable code, etc.).

In some example embodiments, after estimating one possible location of the machine-readable code region within the image, multiple potential machine-readable code locations may be estimated (e.g., as part of locating the machine-readable code, such as at operation 230 in the method 200) by slightly scaling the estimated machine-readable code location (e.g., expanding or reducing the estimated perimeter of the machine-readable code region). These multiple potential machine-readable code locations may be passed onto subsequent processes (e.g., binarization or decoding as described below) with the intention that at least one estimated machine-readable code location will result in a successful decoding.

Binarizing

In certain example embodiments, the method 200 (at operation 240) includes further image processing, such as binarizing at least the regions located in operation 230 (e.g., the machine-readable code region of the image). As used herein, "binarization" refers to converting an image or a region thereof to only two colors (e.g., a light color, such as white, and a dark color, such as black). Binarization of the located region, which converts the machine-readable code region of the image into a binary image (e.g., black and white, as opposed to a grayscale representation with at least three distinct grayscale shades, such as black, gray, and white) may have the effect of removing any residual darkening by the substance (e.g., blood) in the image of the machine-readable code. The located region may be further processed based on information that is local or otherwise specific to the region, such as its color histogram, its orientation histogram, or both. For example, the region may be binarized at least in part with Otsu thresholding (e.g., based on the color histogram of the region). In other example embodiments, posterization or other quantizing of color information to more than two resulting colors is used instead of binarization.

As another example, binarizing the region (e.g., the machine-readable code region) may include fitting a grid shaped like the machine-readable code to an edge map of the region, generating a histogram of median colors of the resulting grid blocks, and applying Otsu thresholding on the generated histogram of median colors. The Otsu thresholding can be used to determine which grid blocks correspond to light-colored elements in the machine-readable code, and which grid blocks correspond to dark-colored elements in the machine-readable code. The lines of the grid may be linear or parameterized by non-linear equations such that, for example, the grid may be fitted to regions of the image that depict non-rectilinear machine-readable codes, machine-readable codes that have been bent or warped, or both. As another example, in some example embodiments, a neural network or other suitable machine learning model may be trained to output a predicted grid that is shaped like a machine-readable code, based on a raw or preprocessed image that is processed in a manner similar to those described above. Such a neural network may be trained, for example, with a sufficient number of hand-curated grids.

Although the above examples are described as using Otsu thresholding, it should be understood that any suitable thresholding technique may be applied to binarize at least the region (e.g., the machine-readable code region) of the image.

Decoding

Given an image or a portion thereof (e.g., at least the region that depicts the machine-readable code) that is processed (e.g., "cleaned") as described herein, certain example embodiments of the method 200 (at operation 250) include decoding at least the region that depicts the machine-readable code. This may be performed by decoding the binarized machine-readable code region of the image to determine the coded information present in the machine-readable code. Any suitable technique for processing (e.g., reading and decoding) the machine-readable code may be applied to obtain the information (e.g., a string of text characters, such as alphanumeric characters) that has been encoded in the machine-readable code. For example, such an algorithm may use vertical and horizontal scanlines to find an L-shaped finder pattern, an alternating timing pattern, or both, in the machine-readable code, and then use the resulting location and scale information to evaluate each element (e.g., content block) of the machine-readable code. A decoding and error-correction method may be used to then convert the elements of the machine-readable code (e.g., content blocks) into decoded data (e.g., a decoded string).

In situations where multiple potential locations for the machine-readable code have been estimated or guessed, the decoding of the machine-readable code may be performed for each of the potential locations, and the results may be compared to each other. A decoded string may be returned (e.g., outputted for subsequent use) if at least one of the potential locations for the machine-readable code results in a successful decoding. Furthermore, in some example embodiments, the return of a decoded string may be further conditioned on sufficient consistency among the potential locations. For example, a decoded string may be returned if no two guesses result in conflicting decoded strings, or if a suitable number (e.g., a majority) of guesses result in the same, common decoded string.

Utilizing Decoded Information

After a decoded string from the machine-readable code is returned, information in the decoded string may be utilized in any suitable manner, which may depend on the type of the coded information. For example, the method 200 may include incrementing a textile counter index, based on the decoded information (e.g., increment a textile counter index if the scanned and decoded machine-readable code is determined to be distinct from other scanned and decoded machine-readable codes). In some example embodiments, multiple textile counter indices may be maintained (e.g., a first index for surgical sponges, a second index for chux, etc.). For example, the coded information may include a type of textile (e.g., a textile type) in addition to a unique identifier (e.g., a serial number), such that only the corresponding textile counter index for that textile type is incremented in response to the machine-readable code being scanned and decoded.

Furthermore, the method 200 may further include outputting the textile counter index, such as by displaying the textile counter index (e.g., as a count of textiles of that type) on a display, or outputting the textile counter index (e.g., the count of textiles of that type) as an audible count through an audio device (e.g., a speaker).

Systems for Processing an Image of a Machine-Readable Code

As shown in FIG. 1, according to some example embodiments, a system 100 for processing an image of a machine-readable code includes at least one processor 152 and memory 154 having instructions stored therein. The processor 152 is configured to execute the stored instructions such that it is configured to: receive an image of a machine-readable code comprising coded information, where the machine-readable code is at least partially obscured by a substance having a predominant color; generate an adjusted image by adjusting a color space of the image based on the predominant color; binarize at least a region (e.g., a machine-readable code region) of the image, where the region of the image depicts the machine-readable code; and decode the binarized region of the image to determine the coded information. The system 100 may, in certain example embodiments, be configured to substantially perform the method 200 described in further detail above. Examples of the system 100 are further described below with respect to FIG. 4.

As further shown in FIG. 1, the system 100 may include a camera 156 configured to obtain (e.g., capture or otherwise generate) one or more images of the machine-readable code, and the system 100 may include a display 158 (e.g., a display screen) configured to display one or more images of the machine-readable code. In some example embodiments, some or all of the system 100 may be in an integrated device (e.g., the mobile device 150) and placed near the patient during the surgical procedure (e.g., in the operating room) to assess patient fluids that are contained (e.g., absorbed) in surgical textiles. For example, the system 100 may at least partially include a handheld or mobile electronic computing device (e.g., the mobile device 150), which may be configured to execute a native fluid analysis application program. Such a handheld or mobile electronic computing device may, for example, be or include a tablet computer, a laptop computer, a mobile smartphone, or any suitable combination thereof, which may include the camera 156, the processor 152, and the display 158. However, in other example embodiments, some or all of the system components may be separated as discrete, interconnected devices. For example, the camera 156, the display 158, or both, may be located substantially near the patient during the surgical procedure (e.g., in the operating room), while the processor 152 may be located at a remote location (e.g., in the operating room separate from the camera 156 or the display 158, or outside the operating room) and communicating with the camera 156 and the display 158 through a wired or wireless connection or other network.

Generally, one or more processors 152 may be configured to execute the instructions that are stored in a memory 154 such that, when it executes the instructions, the processor 152 performs aspects of the methods described herein. The instructions may be executed by computer-executable components integrated with an application, an applet, a host, a server, a network, a website, a communication service, a communication interface, hardware, firmware, software, or any suitable combination thereof within a user computer or other user device (e.g., a mobile device, a wristband, a smartphone, or any suitable combination thereof). The instructions may be stored on a memory or on another computer-readable medium, such as a RAM, a ROM, a flash memory, an EEPROM, an optical disk (e.g., a CD or a DVD), a hard drive, a floppy drive, or any other suitable device.

As described above, the one or more processors 152 may be integrated into a handheld or mobile device (e.g., the mobile device 150). In other example embodiments, the one or more processors 152 are incorporated into a computing device or system, such as a cloud-based computer system, a mainframe computer system, a grid-computer system, or other suitable computer system. Additionally or alternatively, the one or more processors 152 may be incorporated into a remote server that receives images of surgical textiles, reconstructs such images (e.g., as described above), analyzes such images (e.g., as described above), and transmits the quantifications of one or more aspects of fluid in the surgical textiles to another computing device, which may have a display for displaying the quantifications to a user. Examples of the one or more processors 152 are further described below with respect to FIG. 4.

The system 100 may further include an optical sensor (e.g., in the camera 156) that functions to generate one or more images, such as a set of one or more still images or as part of a video feed. The camera 156 may include at least one optical image sensor (e.g., CCD, CMOS, etc.) that captures a color optical digital image with red, green, and blue (RGB) color components for the pixels of the color optical digital image, other suitable optical components, or both. For example, the camera 156 may include a single image sensor paired with suitable corresponding optics, filters (e.g., color filter arrays such as a Bayer pattern filter), or both. As another example, the camera 156 may include multiple image sensors paired with suitable corresponding optics, such as at least one prism or diffractive surface to divide white light into separate color channels (e.g., RGB), each of which is detected by a respective image sensor. According to various example embodiments, the camera 156 includes any suitable image sensors and other optical components to enable the camera 156 to generate images.

The camera 156 may be configured to transmit images to the processor 152 for analysis, to a database that stores the images, or to both. As previously described, the camera 156 may be integrated in the same device (e.g., the mobile device 150) as one or more of the other components of the system 100, or the camera 156 may be a separate component that communicates the image data to the other components.

The system 100 may further include the display 158 (e.g., a display screen) that functions to display or otherwise communicate (e.g., present) to a user (e.g., a doctor or a nurse) some or all of the information that is generated by the system 100, including but not limited to patient information, images of surgical textiles, quantified metrics characterizing fluid in the surgical textile, or any suitable combination thereof. The display 158 may include a screen on a handheld or mobile device, a computer monitor, a television screen, a projector screen, or other suitable display.

In some example embodiments, the display 158 is configured to display a user interface (e.g., a graphical user interface (GUI)) that enables the user to interact with displayed information. For example, the user interface may enable the user to manipulate the images (e.g., zoom, crop, rotate, etc.) or manually define the region that depicts at least the machine-readable code in the image. As another example, the user interface may enable the user to select display options (e.g., font, color, language, etc.), select content to be shown (e.g., patient information, quantified metrics or other fluid-related information, alerts, etc.), or both. In some such example embodiments, the display 158 is user-interactive and include a resistive or capacitive touchscreen that is responsive to skin, a stylus, or other user contact. In other such example embodiments, the display 158 is user-interactive via a cursor controlled by a mouse, keyboard, or other input device.

In some example embodiments, the system 100 includes an audio system that communicates information to the user. The display 158, the audio system, or both, may provide (e.g., present) the current value of the textile counter index, which may assist in tracking use of surgical textiles during a procedure.

EXAMPLE

Figure 3A:
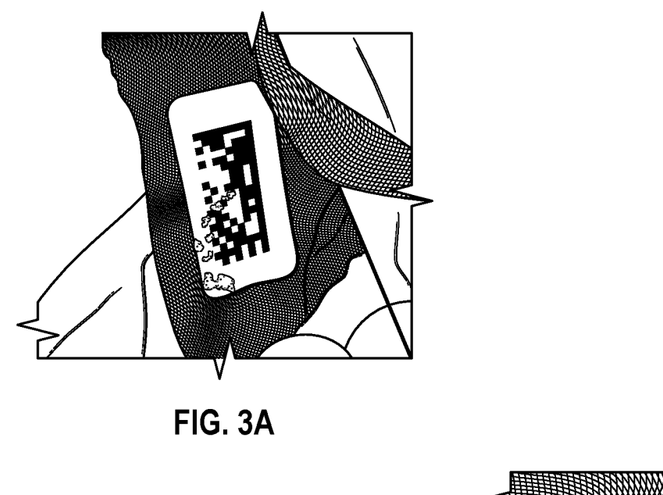
FIGS. 3A-3H are pictures illustrating machine-readable codes imaged and processed in accordance with the method of FIG. 2, according to some example embodiments.
Figure 3B:
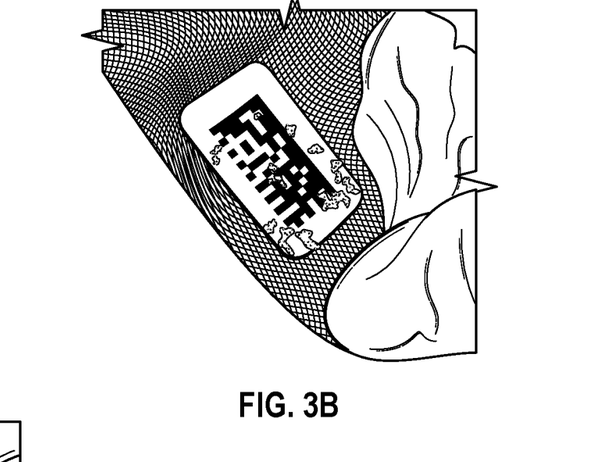
Figure 3C:
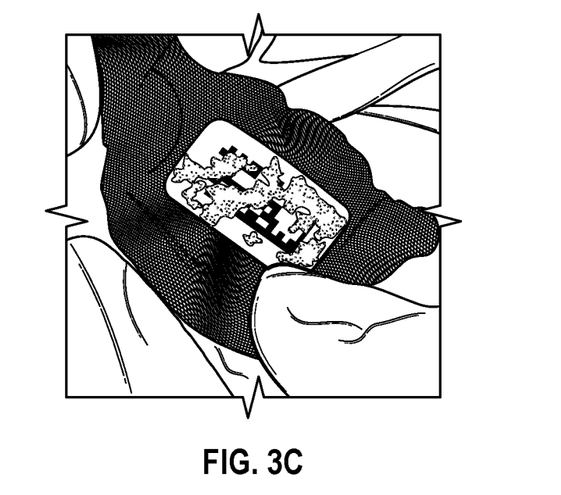
Figure 3D:
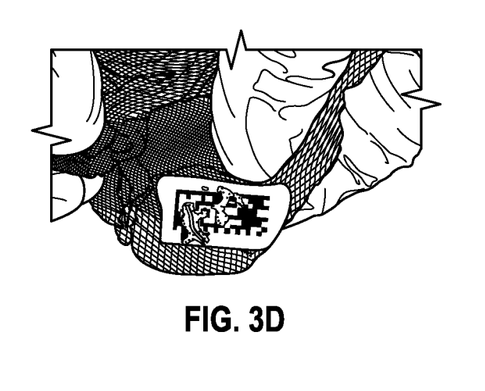
Figure 3E:
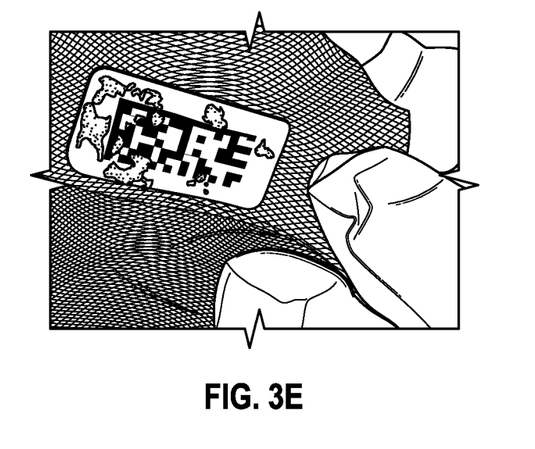
Figure 3F:
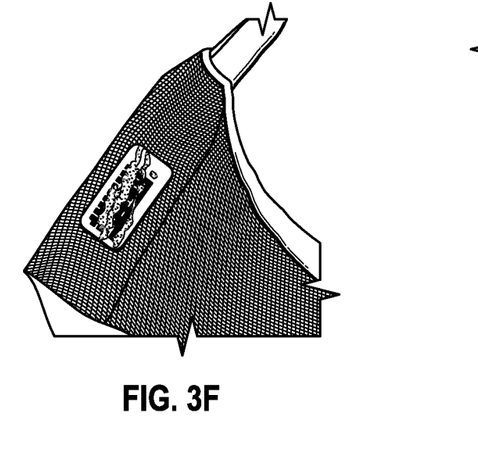
Figure 3G:
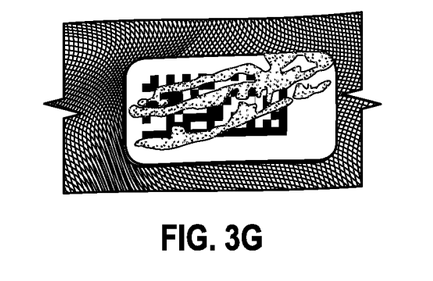
Figure 3H:
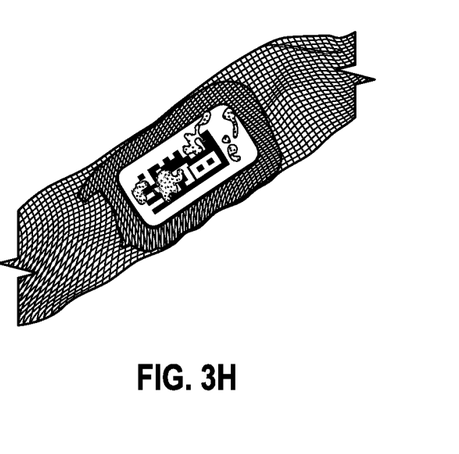

FIGS. 3A-3H are images of 2D machine-readable codes attached to surgical textiles, according to some example embodiments. These machine-readable codes were partially obscured to varying degrees with a red dye solution (e.g., water mixed with red food coloring) that mimics blood. For example, the machine-readable code depicted in FIG. 3A is only lightly covered with the dye solution, primarily on an outside border of the machine-readable code. The machine-readable codes depicted in FIGS. 3B through 3H are generally increasingly heavily covered with the dye solution.

A machine-readable code reader app (e.g., configured to read QR codes) on a mobile device (e.g., the mobile device 150) was used to attempt to scan and decode each of the machine-readable codes depicted in FIGS. 3A-3H. The machine-readable code reader successfully decoded the machine-readable code of FIG. 3A, but failed to decode the machine-readable codes of FIGS. 3B-3H.

Color (RGB) images were taken by a camera (e.g., the camera 156) and converted to a grayscale representation by isolating and taking only the R (red) channel values. For each image, a plurality of guesses at the region that depicts the machine-readable code were generated by applying a Harris corner detector (e.g., implementing a Harris corner detection algorithm), thresholding heat map values to identify corner coordinates and straight edge coordinates, removing outliers among the corner coordinates and straight edge coordinates, and fitting a rectangle to the resulting remaining coordinates. The machine-readable code regions of the images were further preprocessed with Otsu thresholding to binarize the located regions that depict the machine-readable codes, and then fed into a machine-readable code processing algorithm in search of a successfully decoded string. For each machine-readable code, a decoded string was returned if there were any successful attempts to decode any guessed region among the plurality of guesses at the machine-readable code region, and if none of the decoded results were in conflict. As a result of repeating this process, a successful decoding of the machine-readable code was achieved for all of the machine-readable codes shown in FIGS. 3A-3H.

Any one or more of the components described herein may be implemented using hardware alone or a combination of hardware and software. For example, any component described herein may physically include an arrangement of one or more processors (e.g., the processor 152) configured to perform the operations described herein for that component. As another example, any component described herein may include software, hardware, or both, that configure an arrangement of one or more processors (e.g., the processor 152) to perform the operations described herein for that component. Accordingly, different components described herein may include and configure different arrangements of processors at different points in time or a single arrangement of such processors at different points in time. Each component described herein is an example of a means for performing the operations described herein for that component. Moreover, any two or more components described herein may be combined into a single component, and the functions described herein for a single component may be subdivided among multiple components. Furthermore, according to various example embodiments, components described herein as being implemented within a single system or machine (e.g., a single device) may be distributed across multiple systems or machines (e.g., multiple devices).

Any of the systems or machines (e.g., devices) discussed herein may be, include, or otherwise be implemented in a special-purpose (e.g., specialized or otherwise non-conventional and non-generic) computer that has been modified to perform one or more of the functions described herein for that system or machine (e.g., configured or programmed by special-purpose software, such as one or more software modules of a special-purpose application, operating system, firmware, middleware, or other software program). For example, a special-purpose computer system able to implement any one or more of the methodologies described herein is discussed below with respect to FIG. 4, and such a special-purpose computer may accordingly be a means for performing any one or more of the methodologies discussed herein. Within the technical field of such special-purpose computers, a special-purpose computer that has been specially modified (e.g., configured by special-purpose software) by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines. Moreover, any two or more of the systems or machines discussed herein may be combined into a single system or machine, and the functions described herein for any single system or machine may be subdivided among multiple systems or machines.

Figure 4:
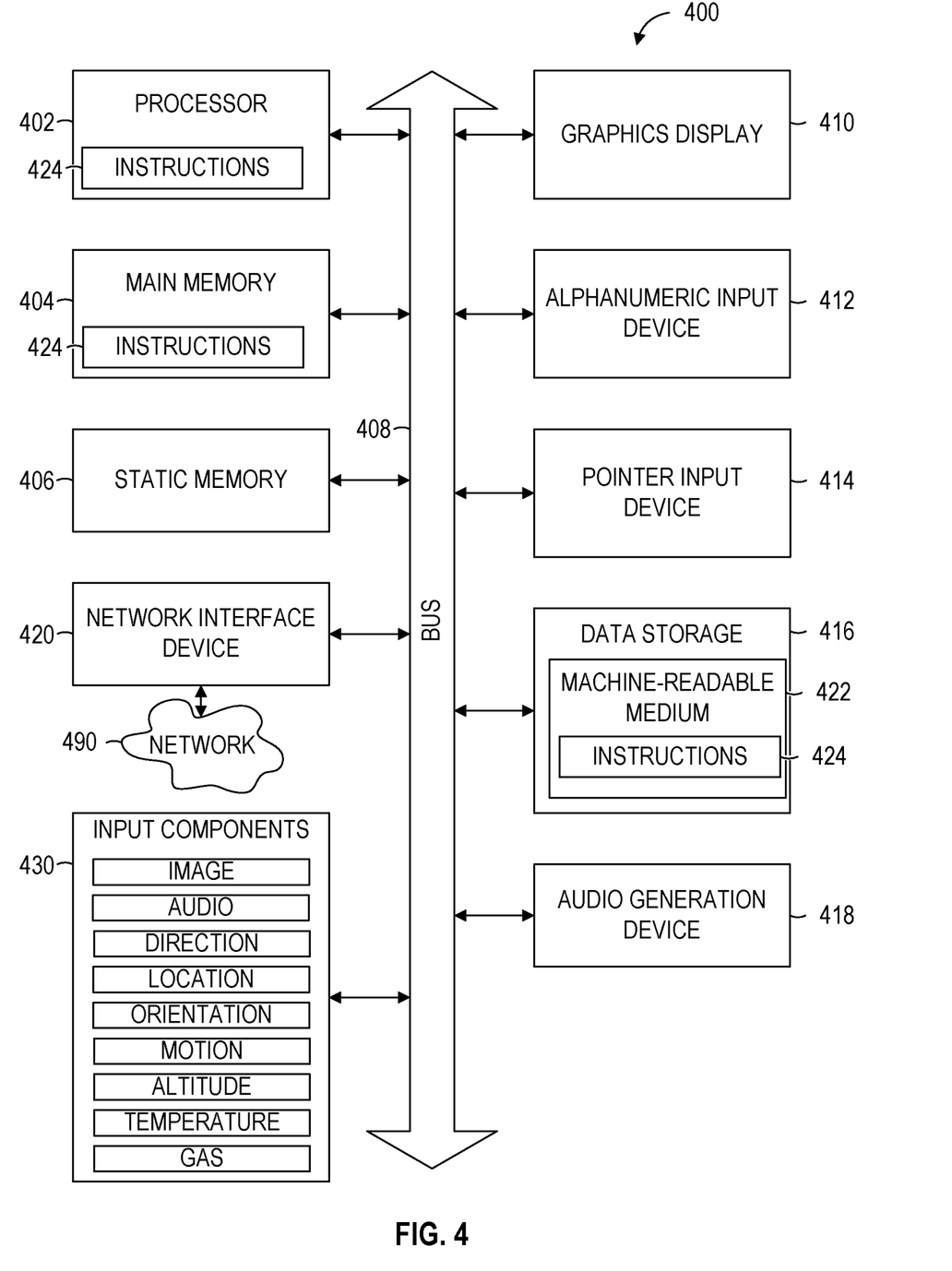
FIG. 4 is a block diagram illustrating components of a machine, according to some example embodiments, able to read instructions from a machine-readable medium and perform any one or more of the methodologies discussed herein.

FIG. 4 is a block diagram illustrating components of a machine 400 (e.g., the mobile device 150), according to some example embodiments, able to read instructions 424 from a machine-readable medium 422 (e.g., a non-transitory machine-readable medium, a machine-readable storage medium, a computer-readable storage medium, or any suitable combination thereof) and perform any one or more of the methodologies discussed herein, in whole or in part. Specifically, FIG. 4 shows the machine 400 in the example form of a computer system (e.g., a computer) within which the instructions 424 (e.g., software, a program, an application, an applet, an app, or other executable code) for causing the machine 400 to perform any one or more of the methodologies discussed herein may be executed, in whole or in part.

In alternative embodiments, the machine 400 operates as a standalone device or may be communicatively coupled (e.g., networked) to other machines. In a networked deployment, the machine 400 may operate in the capacity of a server machine or a client machine in a server-client network environment, or as a peer machine in a distributed (e.g., peer-to-peer) network environment. The machine 400 may be a server computer, a client computer, a personal computer (PC), a tablet computer, a laptop computer, a netbook, a cellular telephone, a smart phone, a set-top box (STB), a personal digital assistant (PDA), a web appliance, a network router, a network switch, a network bridge, or any machine capable of executing the instructions 424, sequentially or otherwise, that specify actions to be taken by that machine. Further, while only a single machine is illustrated, the term "machine" shall also be taken to include any collection of machines that individually or jointly execute the instructions 424 to perform all or part of any one or more of the methodologies discussed herein.

The machine 400 includes a processor 402 (e.g., one or more central processing units (CPUs), one or more graphics processing units (GPUs), one or more digital signal processors (DSPs), one or more application specific integrated circuits (ASICs), one or more radio-frequency integrated circuits (RFICs), or any suitable combination thereof), a main memory 404, and a static memory 406, which are configured to communicate with each other via a bus 408. The processor 402 contains solid-state digital microcircuits (e.g., electronic, optical, or both) that are configurable, temporarily or permanently, by some or all of the instructions 424 such that the processor 402 is configurable to perform any one or more of the methodologies described herein, in whole or in part. For example, a set of one or more microcircuits of the processor 402 may be configurable to execute one or more modules (e.g., software modules) described herein. In some example embodiments, the processor 402 is a multicore CPU (e.g., a dual-core CPU, a quad-core CPU, an 8-core CPU, or a 128-core CPU) within which each of multiple cores behaves as a separate processor that is able to perform any one or more of the methodologies discussed herein, in whole or in part. Although the beneficial effects described herein may be provided by the machine 400 with at least the processor 402, these same beneficial effects may be provided by a different kind of machine that contains no processors (e.g., a purely mechanical system, a purely hydraulic system, or a hybrid mechanical-hydraulic system), if such a processor-less machine is configured to perform one or more of the methodologies described herein.

The machine 400 may further include a graphics display 410 (e.g., a plasma display panel (PDP), a light emitting diode (LED) display, a liquid crystal display (LCD), a projector, a cathode ray tube (CRT), or any other display capable of displaying graphics or video). The machine 400 may also include an alphanumeric input device 412 (e.g., a keyboard or keypad), a pointer input device 414 (e.g., a mouse, a touchpad, a touchscreen, a trackball, a joystick, a stylus, a motion sensor, an eye tracking device, a data glove, or other pointing instrument), a data storage 416, an audio generation device 418 (e.g., a sound card, an amplifier, a speaker, a headphone jack, or any suitable combination thereof), and a network interface device 420.

The data storage 416 (e.g., a data storage device) includes the machine-readable medium 422 (e.g., a tangible and non-transitory machine-readable storage medium) on which are stored the instructions 424 embodying any one or more of the methodologies or functions described herein. The instructions 424 may also reside, completely or at least partially, within the main memory 404, within the static memory 406, within the processor 402 (e.g., within the processor's cache memory), or any suitable combination thereof, before or during execution thereof by the machine 400. Accordingly, the main memory 404, the static memory 406, and the processor 402 may be considered machine-readable media (e.g., tangible and non-transitory machine-readable media). The instructions 424 may be transmitted or received over a network 490 via the network interface device 420. For example, the network interface device 420 may communicate the instructions 424 using any one or more transfer protocols (e.g., hypertext transfer protocol (HTTP)).

In some example embodiments, the machine 400 may be a portable computing device (e.g., a smart phone, a tablet computer, or a wearable device), and may have one or more additional input components 430 (e.g., sensors or gauges). Examples of such input components 430 include an image input component (e.g., one or more cameras), an audio input component (e.g., one or more microphones), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), a temperature input component (e.g., a thermometer), and a gas detection component (e.g., a gas sensor). Input data gathered by any one or more of these input components 430 may be accessible and available for use by any of the modules described herein (e.g., with suitable privacy notifications and protections, such as opt-in consent or opt-out consent, implemented in accordance with user preference, applicable regulations, or any suitable combination thereof).

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 422 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of carrying (e.g., storing or communicating) the instructions 424 for execution by the machine 400, such that the instructions 424, when executed by one or more processors of the machine 400 (e.g., processor 402), cause the machine 400 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible and non-transitory data repositories (e.g., data volumes) in the example form of a solid-state memory chip, an optical disc, a magnetic disc, or any suitable combination thereof.

A "non-transitory" machine-readable medium, as used herein, specifically excludes propagating signals per se. According to various example embodiments, the instructions 424 for execution by the machine 400 can be communicated via a carrier medium (e.g., a machine-readable carrier medium). Examples of such a carrier medium include a non-transient carrier medium (e.g., a non-transitory machine-readable storage medium, such as a solid-state memory that is physically movable from one place to another place) and a transient carrier medium (e.g., a carrier wave or other propagating signal that communicates the instructions 424).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module in which the hardware includes one or more processors. Accordingly, the operations described herein may be at least partially processor-implemented, hardware-implemented, or both, since a processor is an example of hardware, and at least some operations within any one or more of the methods discussed herein may be performed by one or more processor-implemented modules, hardware-implemented modules, or any suitable combination thereof.

Moreover, such one or more processors may perform operations in a "cloud computing" environment or as a service (e.g., within a "software as a service" (SaaS) implementation). For example, at least some operations within any one or more of the methods discussed herein may be performed by a group of computers (e.g., as examples of machines that include processors), with these operations being accessible via a network (e.g., the Internet) and via one or more appropriate interfaces (e.g., an application program interface (API)). The performance of certain operations may be distributed among the one or more processors, whether residing only within a single machine or deployed across a number of machines. In some example embodiments, the one or more processors or hardware modules (e.g., processor-implemented modules) may be located in a single geographic location (e.g., within a home environment, an office environment, or a server farm). In other example embodiments, the one or more processors or hardware modules may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and their functionality presented as separate components and functions in example configurations may be implemented as a combined structure or component with combined functions. Similarly, structures and functionality presented as a single component may be implemented as separate components and functions. These and other variations, modifications, additions, and improvements fall within the scope of the subject matter herein.

Some portions of the subject matter discussed herein may be presented in terms of algorithms or symbolic representations of operations on data stored as bits or binary digital signals within a memory (e.g., a computer memory or other machine memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "accessing," "processing," "detecting," "computing," "calculating," "determining," "generating," "presenting," "displaying," or the like refer to actions or processes performable by a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following enumerated descriptions describe various examples of methods, machine-readable media, and systems (e.g., machines, devices, or other apparatus) discussed herein.

A first example provides a method comprising:

accessing, by one or more processors of a machine, an image that depicts a machine-readable code being at least partially obscured by a substance that has a predominant color in the image;

generating, by the one or more processors of the machine, an adjusted version of the image by adjusting a color space of the image based on the predominant color of the substance that at least partially obscures the machine-readable code; and binarizing, by the one or more processors of the machine, at least a region of the adjusted version of the image, the region depicting the machine-readable code.

A second example provides a method according to the first example, further comprising:

capturing, by an optical sensor, the image that depicts the machine-readable code being at least partially obscured by the substance that has the predominant color.

A third example provides a method according to the first example or the second example, wherein the predominant color of the substance that at least partially obscures the machine-readable code is substantially red.

A fourth example provides a method according to any of the first through third examples, wherein:

the image is a color image; and the adjusting of the color space of the image includes converting the color space of the color image to a grayscale representation based on the predominant color of the substance.

A fifth example provides a method according to any of the first through fourth examples, wherein the binarizing of at least the region of the image includes color thresholding a histogram of at least the region of the image.

A sixth example provides a method according to any of the first through fifth examples, further comprising:

locating the region that depicts the machine-readable code in the adjusted version of the image.

A seventh example provides a method according to the sixth example, wherein the locating of the region that depicts the machine-readable code in the adjusted version of the image includes performing at least one of corner detection on the adjusted version of the image or edge detection on the adjusted version of the image.

An eighth example provides a method according to any of the first through seventh examples, wherein the image depicts the machine-readable code attached to a surgical textile soiled by the substance that has the predominant color.

A ninth example provides a method according to any of the first through eighth examples, wherein the machine-readable code represents coded information that includes at least one of a type of a surgical textile or an identifier of the surgical textile.

A tenth example provides a method according to any of the first through ninth examples, further comprising:

determining coded information represented by the machine-readable code by decoding the binarized region that depicts the machine-readable code (e.g., by decoding the binarized region in which the image depicts the machine-readable code).

An eleventh example provides a method according to the tenth example, further comprising.

incrementing a textile counter index in response to the determining of the coded information represented by the machine-readable code.

A twelfth example provides a system (e.g., a computer system) comprising:
one or more processors; and
a memory storing instructions that, when executed by the one or more processors, cause the one or more processors to perform operations comprising:
accessing an image that depicts a machine-readable code being at least partially obscured by a substance that has a predominant color in the image;
generating an adjusted version of the image by adjusting a color space of the image based on the predominant color of the substance that at least partially obscures the machine-readable code; and
binarizing at least a region of the adjusted version of the image, the region depicting the machine-readable code.

A thirteenth example provides a system according to the twelfth example, further comprising an optical sensor configured to capture the image that depicts the machine-readable code being at least partially obscured by the substance that has the predominant color.

A fourteenth example provides a system according to the twelfth example or the thirteenth example, wherein the predominant color of the substance that at least partially obscures the machine-readable code is substantially red.

A fifteenth example provides a system according to any of the twelfth through fourteenth examples, wherein:
the image is a color image; and
the adjusting of the color space of the image includes converting the color space of the color image to a grayscale representation based on the predominant color of the substance.

A sixteenth example provides a system according to any of the twelfth through fifteenth examples, wherein the binarizing of at least the region of the image includes color thresholding a histogram of at least the region of the image.

A seventeenth example provides a system according to any of the twelfth through sixteenth examples, wherein the operations further comprise:
locating the region that depicts the machine-readable code in the adjusted version of the image.

An eighteenth example provides a system according to the seventeenth example, wherein the locating of the region that depicts the machine-readable code in the adjusted version of the image includes performing at least one of corner detection on the adjusted version of the image or edge detection on the adjusted version of the image.

A nineteenth example provides a system according to any of the twelfth through eighteenth examples, wherein the image depicts the machine-readable code attached to a surgical textile soiled by the substance that has the predominant color.

A twentieth example provides a system according to any of the twelfth through nineteenth examples, wherein the machine-readable code represents coded information that includes at least one of a type of a surgical textile or an identifier of the surgical textile.

A twenty-first example provides a system according to any of the twelfth through twentieth examples, wherein the operations further comprise:
determining coded information represented by the machine-readable code by decoding the binarized region that depicts the machine-readable code (e.g., by decoding the binarized region in which the image depicts the machine-readable code).

A twenty-second example provides a system according to any of the twelfth through twenty-first examples, wherein the operations further comprise:
incrementing a textile counter index in response to the determining of the coded information represented by the machine-readable code.

A twenty-third example provides a machine-readable medium (e.g., a non-transitory machine-readable storage medium) comprising instructions that, when executed by one or more processors of a machine, cause the machine to perform operations comprising:
accessing an image that depicts a machine-readable code being at least partially obscured by a substance that has a predominant color in the image;
generating an adjusted version of the image by adjusting a color space of the image based on the predominant color of the substance that at least partially obscures the machine-readable code; and
binarizing at least a region of the adjusted version of the image, the region depicting the machine-readable code.

A twenty-fourth example provides a carrier medium carrying machine-readable instructions for controlling a machine to carry out the operations (e.g., method operations) performed in any one of the previously described examples.

What is claimed is:

1. A method comprising:
accessing, by one or more processors of a machine, an image that depicts a machine-readable code being at least partially obscured by a substance that has a predominant color in the image;
generating, by the one or more processors of the machine, an adjusted version of the image by adjusting a color space of the image based on the predominant color of the substance that at least partially obscures the machine-readable code; and
binarizing, by the one or more processors of the machine, at least a region of the adjusted version of the image, the region depicting the machine-readable code.

2. The method of claim 1, further comprising:
capturing, by an optical sensor, the image that depicts the machine-readable code being at least partially obscured by the substance that has the predominant color.

3. The method of claim 1, wherein the predominant color of the substance that at least partially obscures the machine-readable code is substantially red.

4. The method of claim 1, wherein:
the image is a color image; and
the adjusting of the color space of the image includes converting the color space of the color image to a grayscale representation based on the predominant color of the substance.

5. The method of claim 1, wherein the binarizing of at least the region of the image includes color thresholding a histogram of at least the region of the image.

6. The method of claim 1, further comprising:
locating the region that depicts the machine-readable code in the adjusted version of the image.

7. The method of claim 6, wherein the locating of the region that depicts the machine-readable code in the adjusted version of the image includes performing at least one of corner detection on the adjusted version of the image or edge detection on the adjusted version of the image.

8. The method of claim 1, wherein the image depicts the machine-readable code attached to a surgical textile soiled by the substance that has the predominant color.

9. The method of claim 1, wherein the machine-readable code represents coded information that includes at least one of a type of a surgical textile or an identifier of the surgical textile.

10. The method of claim 1, further comprising:
determining coded information represented by the machine-readable code by decoding the binarized region that depicts the machine-readable code.

11. The method of claim 10, further comprising:
incrementing a textile counter index in response to the determining of the coded information represented by the machine-readable code.

12. A system comprising:
one or more processors; and
a memory storing instructions that, when executed by the one or more processors, cause the one or more processors to perform operations comprising:
accessing an image that depicts a machine-readable code being at least partially obscured by a substance that has a predominant color in the image;
generating an adjusted version of the image by adjusting a color space of the image based on the predominant color of the substance that at least partially obscures the machine-readable code; and
binarizing at least a region of the adjusted version of the image, the region depicting the machine-readable code.

13. The system of claim 12, further comprising an optical sensor configured to capture the image that depicts the machine-readable code being at least partially obscured by the substance that has the predominant color.

14. The system of claim 12, wherein the predominant color of the substance that at least partially obscures the machine-readable code is substantially red.

15. The system of claim 12, wherein:
the image is a color image; and
the adjusting of the color space of the image includes converting the color space of the color image to a grayscale representation based on the predominant color of the substance.

16. The system of claim 12, wherein the binarizing of at least the region of the image includes color thresholding a histogram of at least the region of the image.

17. The system of claim 12, wherein the operations further comprise:
locating the region that depicts the machine-readable code in the adjusted version of the image.

18. The system of claim 17, wherein the locating of the region that depicts the machine-readable code in the adjusted version of the image includes performing at least one of corner detection on the adjusted version of the image or edge detection on the adjusted version of the image.

19. The system of claim 12, wherein the image depicts the machine-readable code attached to a surgical textile soiled by the substance that has the predominant color.

20. The system of claim 12, wherein the machine-readable code represents coded information that includes at least one of a type of a surgical textile or an identifier of the surgical textile.

21. The system of claim 12, wherein the operations further comprise:
determining coded information represented by the machine-readable code by decoding the binarized region that depicts the machine-readable code.

22. The system of claim 21, wherein the operations further comprise:
incrementing a textile counter index in response to the determining of the coded information represented by the machine-readable code.

23. A machine-readable storage medium comprising instructions that, when executed by one or more processors of a machine, cause the machine to perform operations comprising:
accessing an image that depicts a machine-readable code being at least partially obscured by a substance that has a predominant color in the image;
generating an adjusted version of the image by adjusting a color space of the image based on the predominant color of the substance that at least partially obscures the machine-readable code; and
binarizing at least a region of the adjusted version of the image, the region depicting the machine-readable code.

* * * * *